United States Patent Office 3,040,030
Patented June 19, 1962

3,040,030
NEW QUINONE DERIVATIVES AND PROCESS
FOR PREPARING SAME
Adrian Marxer, Muttenz, Switzerland, assignor to Ciba
Corporation, a corporation of Delaware
No Drawing. Filed June 30, 1960, Ser. No. 39,825
Claims priority, application Switzerland July 17, 1959
8 Claims. (Cl. 260—239)

The invention provides 2:5-bis-ethylene-imino-3:6-bis-acylamino-para-benzoquinones, in which the acyl radical is that of a cycloaliphatic carboxylic acid and a process for preparing same. As cycloaliphatic carboxylic acids there may be mentioned more especially, cycloalkane carboxylic acids, such as cyclopentane carboxylic acid or preferably cyclohexane carboxylic acid. The ethylene-imino groups may be alkylated at the carbon atoms, advantageously by a methyl group. The invention provides more especially 2:5-bis-ethylene-imino-3:6-bis-cyclohexyl-carbonylamino-para-benzoquinone of the formula

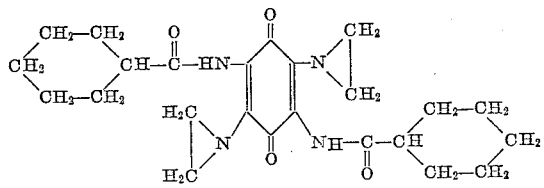

The new benzoquinones are active against amoebae, for example, against *Entamoeba histolytica*, and against bacteria.

The new compounds are made in accordance with the invention by reacting a 2:5-dihalogen-3:6-bis-acyl-amino-para-benzoquinone, in which the acyl radical is that of a cycloaliphatic carboxylic acid, with an ethylene imine. Among the dihalogen compounds there are especially suitable the dichloro- and dibromo-compounds.

The reaction is advantageously carried out in an inert solvent, such as dioxane or benzene or in the presence of an alcohol, such as ethyl alcohol, isopropyl alcohol or butyl alcohol, or isopropyl ether. There is advantageously used a basic condensing agent, especially a tertiary amine, such as trimethylamine or triethylamine. The reaction may be carried out at room temperature or a raised temperature.

The starting materials are known or can be made by methods in themselves known. The new 2:5-dihalogen-3:6-bis-acyl-amino-para-benzoquinones, in which the acyl radical is that of a cycloaliphatic carboxylic acid form also part of the invention. They are obtained by acylation of 2:5-dihalogeno-3,6-diamino-benzoquinones.

The quinones of this invention are useful as bactericides and also as medicaments especially in diseases caused by amoebae, e.g. in the form of pharmaceutical preparations. These preparations contain the aforesaid compounds in admixture with a pharmaceutical organic or inorganic carrier suitable for enteral, parenteral or local administration. As carriers there are used substances which do not react with the new compounds, for example, gelatine, lactose, starch, magnesium stearate, talc, vegetable oils, benzyl alcohols, gums, polyalkylene glycols, white petroleum jelly, cholesterol or other known carrier for medicaments. The pharmaceutical preparations may be, for example, in the form of tablets, dragees, powders, salves, creams or suppositories, or in liquid form as solutions, suspensions or emulsions. If desired they may be sterilized and/or may contain auxiliary substance such as preserving, stabilizing, wetting or emulsifying agents. They advantageously contain from 5–100 milligrams of the active substance per dosage unit. They may also contain other therapeutically valuable substances.

The following example illustrates the invention:

*Example*

30.5 grams of 2:5-dichloro-3:6-bis-cyclohexyl-carbonyl-amino-benzoquinone are suspended in 250 cc. of dioxane. A mixture of 11 cc. of ethylene imine and 20 grams of triethylamine in 50 cc. of dioxane is then added dropwise at room temperature, and the whole is stirred for 7 hours at an internal temperature of 45° C. The crystallizate is isolated by filtering with suction, washed with alcohol, then with water and finally with alcohol, and in this manner there is obtained in the form of small red-violet needles, crystalline 2:5-bis-ethylene-imino-3:6-bis-cyclohexylcarbonylamino-benzoquinone having a decomposition point of 213–216° C. It has the formula

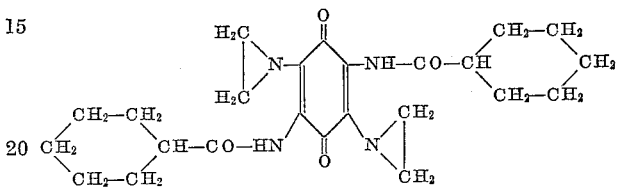

The 2:5-dichloro-3:6-bis-cyclohexylcarbonyl-amino-benzoquinone used as starting material is prepared as follows:

48 grams of 2:5-dichloro-3:6-diamino-benzoquinone are suspended in 185 grams of cyclohexane carboxylic acid anhydride, 2.3 cc. of concentrated sulfuric acid are added, and the suspension is stirred for 18 hours at a water bath temperature of 75° C. Instead of violet crystals of the starting material there is finally present a suspension of yellow crystals. The excess of anhydride is destroyed by the addition of 180 cc. of alcohol, and the resulting 2:5-dichloro-3:6-bis-cyclohexylcarbonylamino-benzoquinone is separated by filtering with suction, washed with alcohol, and recrystallized from glacial acetic acid. It melts at 261–263° C.

What is claimed is:
1. 2:5-bis-ethyleneimino-3:6-bis-cyclohexyl-carbonyl-amino-para-benzoquinone.
2. 2:5-dichloro-3:6-bis-cyclohexyl-carbonylamino-benzoquinone.
3. 2:5-bis-(methyl-ethyleneimino)-3:6-bis-cyclohexyl-carbonyl-amino-para-benzoquinone.
4. 2:5-bis-(methyl-ethyleneimino)-3:6-bis-cyclopentyl-carbonyl-amino-para-benzoquinone.
5. 2:5-bis-ethyleneimino-3:6-bis-cyclopentyl-carbonyl-amino-para-benzoquinone.
6. 2:5-dihalogeno-3:6-bis-cyclohexyl-carbonyl-amino-para-benzoquinone.
7. 2:5-dihalogeno-3:6-bis-cyclopentyl-carbonyl-amino-para-benzoquinone.
8. 2:5-bis-ethyleneimino-3:6-bis-acylamino-para-benzoquinones of the formula:

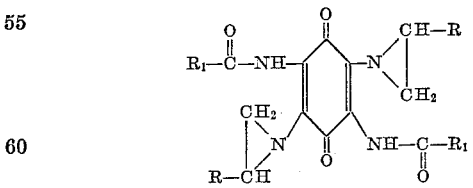

wherein R stands for a member selected from the group consisting of hydrogen and lower alkyl and $R_1$ stands for a member selected from the group consisting of cyclopentyl and cyclohexyl.

References Cited in the file of this patent
UNITED STATES PATENTS
2,802,001  Marxer _____ Aug. 6, 1957
FOREIGN PATENTS
196,389  Austria _____ Mar. 10, 1958